March 1, 1960  J. P. FRANCIS  2,926,679
AUTOMOBILE WINDSHIELD WEATHER CANOPY
Filed Oct. 14, 1958

INVENTOR

John P. Francis

United States Patent Office 2,926,679
Patented Mar. 1, 1960

2,926,679

AUTOMOBILE WINDSHIELD WEATHER CANOPY

John P. Francis, Haverhill, Mass.

Application October 14, 1958, Serial No. 767,182

2 Claims. (Cl. 135—7.1)

This invention relates generally to automobile windshield weather canopies and more particularly to a canopy or awning which is supported above and across the roof top and the windshield area of an automobile from a horizontally mounted supporting arm extending outwardly from an outer vertically movable supporting post, and adapted for use in a drive-in parking area such as a drive-in theatre, an object thereof being to provide a non-complicated, sturdy and inexpensive weather awning structure adapted for the adjustable weather protection of the windshield area of an automobile in providing safe and clear vision at all times during anticipated or inclement weather conditions.

Another object of this invention is to provide a canopy or awning structure whereby the awning is supported for adjustable angular alignment and adapted to be adjusted vertically relative to the roof of the vehicle, thereby providing weather protection to the extremely lowly built automobiles as well as the roofless automobiles, and to adjustably suit any terrain or weather interference existing or anticipated in the general parking area for the automobiles.

A further object of this invention is to provide a vertically adjustable awning adapted to frictionally engage the roof top, or to be adjustably spaced therefrom, depending upon the weather conditions and the direction and the force of the wind, if existing or anticipated.

A still further object of this invention is to provide an automobile windshield weather awning structure which is very easily assembled, adjusted, modified, rotated out of use or dis-assembled either in part or in whole, and adapted to provide unobstructed vision for all the other automobile occupants when the device is in use, or not in use during normal weather conditions.

With these objects and still others in view, as will hereinafter more fully appear, the invention comprises certain novel constructions, combinations and arrangement of parts, hereinafter described and claimed, and illustrated in the accompanying drawings, in which:

Figure 1:
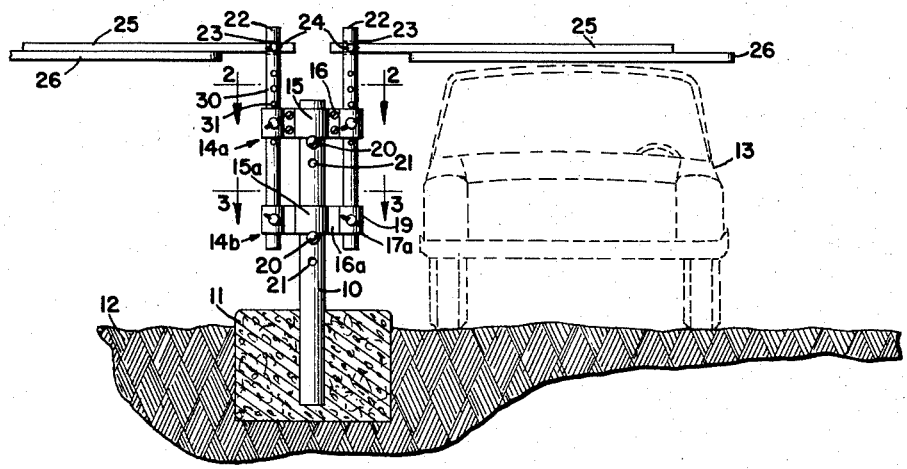
Figure 1 is a front elevation view of the device showing the awning in aligned position relative to the parked automobile, and including a partial view of a similar and opposite weather awning structure.

Referring in detail to the drawings, and more particularly to Figure 1, a vertical center supporting post 10 is shown encased in the concrete anchoring means 11 anchored in the ground 12. Attached to the said center supporting post 10 may be one or more supporting bands 14a or 14b adapted to support the outer vertically and axially adjustable supporting posts 22 therefrom, each form of supporting band having particular advantages.

Figure 2:
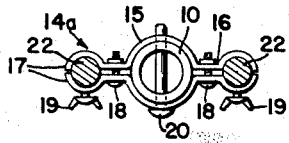
Figure 2 is a cross-sectional view taken on line 2—2 of Figure 1, showing a top plan view of the split-type supporting band.

In Figure 2, a cross-sectional view taken on line 2—2 of Figure 1, there is shown the split-type supporting band generally designated by the numeral 14a and having mated central arcuately contoured main body portions 15 adapted to clampingly engage the center post 10, with the bolts 18 engaging and securing together the outwardly flat extensions 16 thereof. Extending further outwardly from the said flat extensions 16 are the outer arcuately contoured body portions 17, of preferably smaller diameter than the central body portions 15. A horizontally removable supporting pin 20, secured in the desired vertically spaced horizontal aperture 21 of post 10, is adapted to adjustably support the said split-type supporting band 14a, or the one piece supporting band 14b, for any vertical or axial adjustment on the center post 10.

Figure 3:
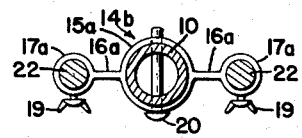
Figure 3 is also a cross-sectional view taken on line 3—3 of Figure 1, showing also a top plan view of the modified form of one piece supporting band.

In Figure 3, a cross-sectional view taken on line 3—3 of Figure 1, there is shown the one piece supporting band generally designated by the numeral 14b and having a central arcuately contoured main body portion 15a adapted to engage the center post 10. The two outer opposing flat extensions 16a have outer arcuately contoured body portions 17a extending therefrom. On either supporting bands 14a or 14b, are wing nuts 19 for adjustably supporting the two outer vertical supporting posts 22.

The split-type supporting band 14a has advantages of removably engaging a center post 10 having unremovable structures extending therefrom, such as fixed speaker baskets. The one piece supporting band 14b is preferable where the said band may be inserted onto the center post 10, upon temporarily removing the speaker baskets therefrom.

The split-type supporting band mounted on a central supporting post with two vertically opposing outer arms is shown and described in my copending application, Serial No. 644,050, filed March 5, 1957, now Patent No. 2,869,562. My invention therefore is concerned primarily with the modified supporting bands and the vertically opposed outer supporting posts with the adjustable supporting arm structure extending therefrom.

Figure 4:
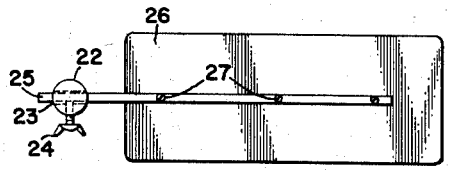
Figure 4 is a top plan view of the awning panel shown supported from the horizontal supporting arm.

In Figure 4, the horizontal supporting arm 25 is shown extending through the cross bore 23 of the outer vertical supporting post 22. Attached to the said supporting arm 25, by screws 27 or other suitable means, is an awning or canopy panel 26 of light semi-rigid material such as Masonite, sheet metal, hard rubber or any other suitable composition.

Figure 5:
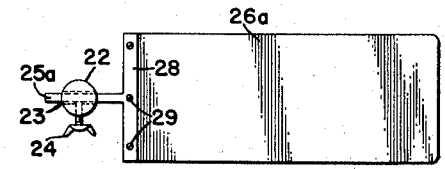
Figure 5 is a top plan view of a modified form of awning panel and supporting structure therefor.

A modified form of awning or canopy panel 26a formed of rubber, plastic or other suitable composition and adapted to be laterally flexible due to the length thereof, and longitudinally rigid due to the shorter width thereof combined with the longitudinal arm support 28 to which it is attached by screws 29 or other suitable means, is shown in Figure 5. A limited horizontal supporting arm 25a extending only a short distance from the outer supporting post 22 with the longitudinal arm support 28, forms the awning supporting structure.

The awning panel 26, or modified panel 26a, is adapted to be angularly adjusted upon the axial alignment of the horizontal supporting arm 25 or 25a, in cross bore 23, and secured in the desired angular adjustment by wing nut 24 engaging outer post 22 and the said horizontal supporting arm.

Vertical adjustment of the awning panel 26 or 26a is provided by the vertically and axially adjustable outer supporting post 22 engaging the opening in either outer body portion 17 of band 14a or outer body portion 17a of band 15a. With vertical and angular alignment of the awning structure, in addition to the axial adjustment of the supporting bands or the outer vertical supporting posts 22, the device thereby provides complete adjustable weather protection to the windshield area regardless of the height, the angle, or the position involved relative to the parked automobile, and the weather conditions involved.

The modified form of awning panel 26a, Figure 5, due to the lateral flexibility and the awning supporting structure thereof, is adapted to engage the lateral portion of the roof top in friction or rain sealing engagement upon the vertical and angular alignment of said structure. The entrance or egress of occupants of the automobile, with the vehicle lowering or rising, does not affect or damage the said awning panel or the roof top of the automobile due to the said lateral flexibility and the supporting structure thereof.

Referring back to Figure 1, a series of vertically spaced horizontal apertures 30 are shown on the two outer vertical supporting posts 22. Inserted through one of the apertures 30, of the outer supporting post 22, is a removable post supporting pin 31 adapted to vertically support said post 22, when wing nut 19 is released, and to also permit axial adjustment of said supporting post.

The automobile windshield weather canopy therefore provides a fully adjustable weather protector providing complete vision protection against any weather condition; complete windshield vision protection for all makes, and the various heights and types of automobiles; complete vision protection against any hazard or obstruction due to the general contour of the terrain in the parking area, and; complete viewing clearance due to any limited vertical height clearance of the movie screen, for full view thereof by the occupants in the parked automobiles.

Having thus described my invention, I desire to add that changes may be made in any one embodiment alone or combined in one embodiment with any one of the other embodiments of the invention.

Changes therefore, in the construction and the arrangement, may be made without departing from the spirit and the scope of the invention as disclosed in the appended claims.

I claim:

1. An automobile windshield weather canopy adapted for erection and use in a drive-in parking area such as a drive-in theatre comprising, a fixed central vertical supporting post, an adjustably mounted supporting band having a central vertical body portion adapted to adjustably engage said central supporting post and opposing outer spaced vertical body portions supported outwardly of said central body portion, said supporting band adapted to be supported for vertically and axially movable adjustment on said fixed central supporting post, outer spaced apart vertically and axially adjustable supporting posts extending from and above each of said opposing outer body portions of said supporting band, a horizontally mounted supporting arm adjustable axially and laterally within the cross bore of the said outer supporting post and adjustable vertically with the said outer post, and an angularly adjustable canopy supported from the said axially adjustable horizontal supporting arm in proximity to the roof top and the upper windshield area of said automobile and adjustably movable thereto in free frictional roof rain sealing engagement or in spaced apart relationship with the said roof top upon the said vertical and the longitudinally axial adjustment of said supporting arm in the alignment of said canopy in providing clear and fully unobstructed vision and complete windshield weather protection to the said windshield area.

2. An automobile windshield weather canopy adapted for erection and use in a drive-in parking area such as a drive-in theatre comprising, a fixed central vertical supporting post, an adjustably mounted supporting band having a central vertical body portion adapted to adjustably engage said central supporting post and opposing outer spaced vertical body portions supported outwardly of said central body portion, said supporting band adapted to be supported for vertically and axially movable adjustment on said fixed central supporting post, outer spaced apart vertically and axially adjustable supporting posts extending from and above each of said opposing outer body portions of said supporting band, a horizontally mounted supporting arm structure adjustable axially and laterally within the cross bore of the said outer supporting post and adjustable vertically with the said outer post, and an angularly adjustable laterally flexible and longitudinally rigid canopy supported from the said axially adjustable horizontal supporting arm structure and adapted to flexibly engage the lateral portion of the roof top in rain sealing engagement therewith upon the said vertical and the longitudinally axial adjustment of the said supporting arm structure in the alignment of said laterally flexible canopy in providing clear and fully unobstructed vision and complete windshield weather protection to the said windshield area.

References Cited in the file of this patent

UNITED STATES PATENTS

| | | |
|---|---|---|
| 739,446 | Reger | Sept. 22, 1903 |
| 2,598,588 | Mullen | May 27, 1952 |
| 2,694,231 | Bermejo | Nov. 16, 1954 |

FOREIGN PATENTS

| | | |
|---|---|---|
| 270,151 | Switzerland | Nov. 1, 1950 |